(12) United States Patent
Wolf et al.

(10) Patent No.: US 7,982,860 B2
(45) Date of Patent: Jul. 19, 2011

(54) DISTANCE MEASURING DEVICE AND METHOD FOR DETERMINING A DISTANCE

(75) Inventors: Peter Wolf, Leinfelden-Echterdingen (DE); Joerg Stierle, Waldenbuch (DE); Bjoern Haase, Stuttgart (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 591 days.

(21) Appl. No.: 12/093,360

(22) PCT Filed: Nov. 9, 2006

(86) PCT No.: PCT/EP2006/068289
§ 371 (c)(1),
(2), (4) Date: Jul. 8, 2008

(87) PCT Pub. No.: WO2007/054535
PCT Pub. Date: May 18, 2007

(65) Prior Publication Data
US 2009/0219165 A1    Sep. 3, 2009

(30) Foreign Application Priority Data

Nov. 14, 2005  (DE) .......................... 10 2005 054 131

(51) Int. Cl.
*G01C 3/08* (2006.01)

(52) U.S. Cl. ...... 356/5.02; 356/4.01; 356/4.1; 356/5.01; 356/5.1; 356/5.15

(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| 6,463,393 B1 | 10/2002 | Giger |
| 2004/0105087 A1 * | 6/2004 | Gogolla et al. .................. 356/3 |

FOREIGN PATENT DOCUMENTS

| DE | 2 229 339 | 11/1973 |
| DE | 2229339 | * 11/1973 |
| DE | 103 50 489 | 6/2005 |
| WO | 98/18019 | 4/1998 |

* cited by examiner

*Primary Examiner* — Thomas H Tarcza
*Assistant Examiner* — Luke D Ratcliffe
(74) *Attorney, Agent, or Firm* — Michael J. Striker

(57) ABSTRACT

The invention is based on a distance-measuring device having a transmission unit (20) for generating a transmission signal (42) having at least one measurement frequency ($f_1$, $f_2$) which is desired for detecting distance information. It is proposed that the transmission unit (20) comprises a means (60) for generating an evaluation signal (62) having an evaluation frequency ($f_A$) which is desired for evaluating the distance information.

9 Claims, 3 Drawing Sheets

DISTANCE MEASURING DEVICE AND METHOD FOR DETERMINING A DISTANCE

PRIOR ART

Figure 1:
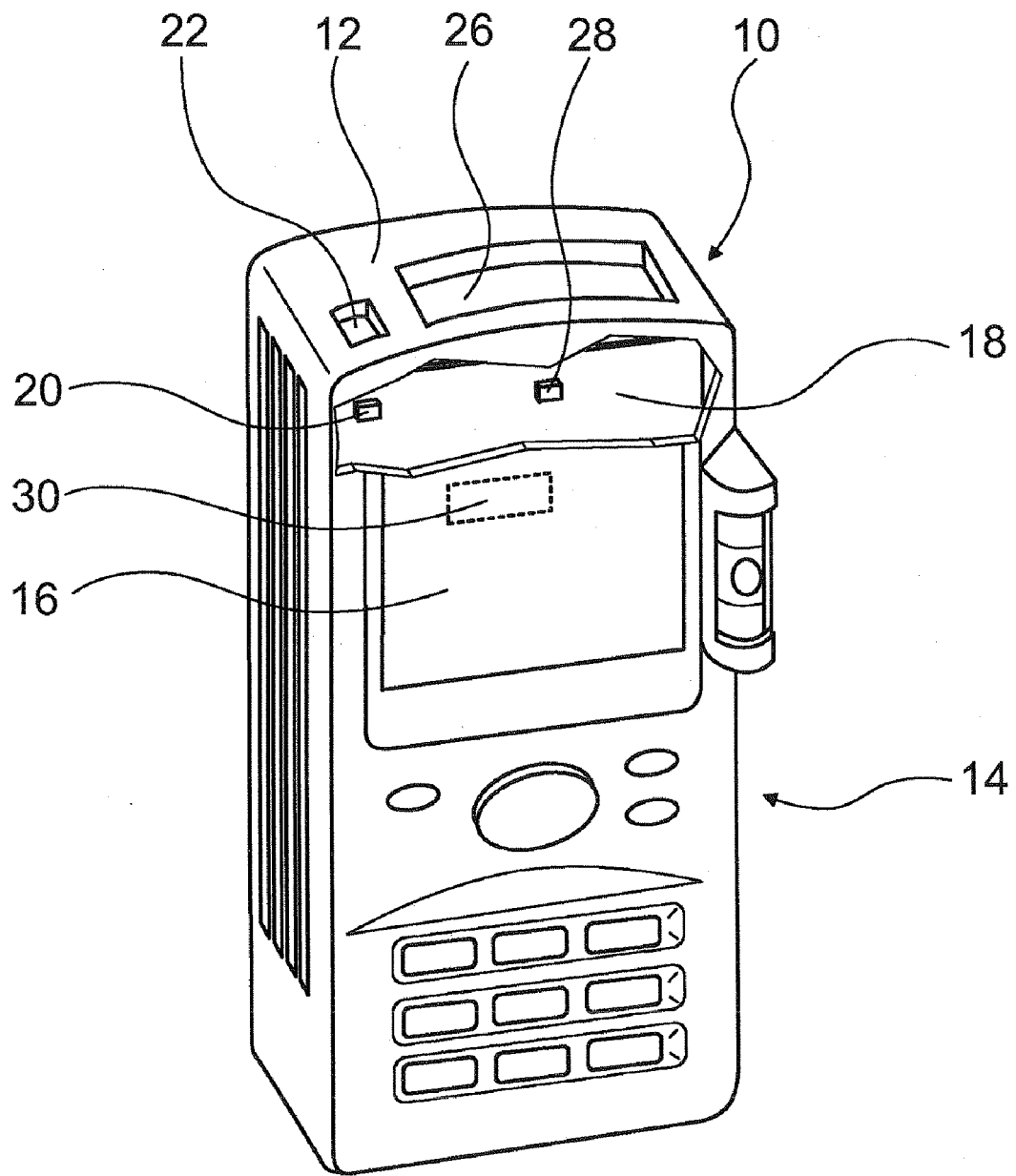

The present invention is based on a distance measuring device according to the preamble to claim 1. The invention also relates to a method for determining a distance according to the preamble to claim 9.

EP 0 932 835 B2 has disclosed a distance measuring device with a laser diode for producing a measurement signal and a photo diode for receiving the measurement signal. In order to calibrate the distance measuring device, the measurement signal produced by the laser diode is deflected through a reference path and directed at a reference diode. By comparing the measurement signal reflected by a measurement object and received by the photo diode to the measurement signal received directly by the reference diode, it is possible to determine a piece of distance information about the measurement object.

ADVANTAGES OF THE INVENTION

With regard to the distance measuring device, the present invention is based on a distance measuring device with a transmitter unit for producing a transmission signal that has at least one measurement frequency that is desired for a determination of a piece of distance information.

Preferably, the transmitter unit includes a means for producing an evaluation signal that has a desired evaluation frequency for an evaluation of the distance information. By producing an evaluation signal inside the transmitter unit, it is possible for the evaluation signal to have a particularly close relationship with the transmission signal in its produced state. The evaluation signal can, for example, have characteristic values such as a frequency, an amplitude, and a phase of the transmission signal in its produced state. As a result, the evaluation signal can advantageously be used as a reference signal. In this case, it is possible to evaluate the distance information by comparing the evaluation signal to the transmission signal, which carries the distance information, is reflected by a measurement object, and is received by the distance measuring device as a reception signal. In particular, it is possible to simply compare a phase position of the reception signal to a phase position of the evaluation signal if the evaluation signal has a fixed relationship to the phase position of the transmission signal in its produced state. Alternatively or in addition to this, a travel time of the transmission signal can be determined by comparing the evaluation signal to the reception signal. The evaluation of the distance information can also be advantageously carried out without requiring further adaptation of the frequency of the evaluation signal. If the evaluation signal is embodied in the form of a reference signal, then it is additionally possible to eliminate a transmission of the reference signal via a reference path, its reception by means of a receiver unit outside the transmitter unit—e.g. by means of a reference diode, and a possible electronic processing of the reference signal. This makes it advantageously possible to eliminate corresponding components and save space.

It is also preferable for the means to be provided in the form of a mixing unit for mixing production signals that are used to produce the transmission signal. This makes it possible to simply achieve a low frequency signal with a mixing of production signals, for example if the production signals have two frequencies that differ from each other by the frequency of the desired low frequency signal. If the evaluation signal is embodied as a mixture result of a mixing of production signals, then an advantageously close relationship of the evaluation signal to the transmission signal in its produced state can be simply achieved, e.g. a locked in-phase coupling of the evaluation signal to the transmission signal in its produced state. Several production signals, which each have at least one frequency, can be overlapped in one electrical signal that transports the production signals to a production point of the transmission signal. In the mixing, the production signals can be multiplied by one another. Alternatively or in addition to this, the production signals can be added to one another. A multiplication of the production signals can be achieved, for example, if in the production of the transmission signal, a transmission signal characteristic value, e.g. an intensity, a frequency, and/or a phase of the production signals is modulated in relation to a characteristic curve and the production signals are mixed at a nonlinearity of the characteristic curve.

In this connection, it is also preferable if the transmitter unit has a transmission means for transmitting the transmission signal and if the transmission means is embodied in the form of a mixing unit. This makes it possible to eliminate additional electronic components for mixing the production signals and allows a corresponding amount of space to be saved. The transmission means can preferably be provided for transmitting a beam of visible light. In particular, the transmission means can be embodied in the form of a laser diode. Alternatively, it is also conceivable for the transmission means to be embodied for a transmission of other electromagnetic radiation such as infrared radiation or radar emissions, or for the transmission of ultrasonic waves. In this case, the production signals can be embodied in the form of modulation signals for modulating a radiation emitted by the transmission means.

In another embodiment variant, the distance measuring device has a phase coupling unit that is provided to couple the evaluation signal to a reference signal in a locked in-phase fashion through a regulation of the production signals. The coupling of the evaluation signal to a reference signal makes it possible to achieve a particularly stable evaluation signal. In addition, regulating the production signals makes it possible to achieve a locked in-phase association of the transmission signal with the reference signal. In this instance, the reference signal is advantageously predetermined, for example in its frequency and its phase position, thus making it possible to carry out an evaluation of the distance information by comparing a reception signal, which carries the distance information, to the reference signal. The phase coupling unit can advantageously be composed of a PLL circuit to which the evaluation signal and the reference signal are supplied. An output of the PLL circuit can preferably be followed by a VCO circuit for producing the production signals, which circuit regulates the production signals as a function of a phase difference between the reference signal and the evaluation signal. A PLL circuit ("phase locked loop" or "phase limiting circuit") and a VCO circuit ("voltage controlled oscillator" or "voltage frequency converter") are well known in the electronics field. A PLL circuit compares the phase position of two signals and emits a voltage that depends on the phase position. A VCO circuit produces a signal with a frequency that depends on the voltage fed into the VCO circuit. Through the combination of a PLL circuit with a VCO circuit, it is thus possible to achieve a circuit arrangement with which an output frequency produced by the VCO circuit can be compared to a fundamental frequency with a high degree of precision.

Advantageously, the evaluation signal is a low frequency signal. It is thus possible to use reasonably priced electronic components for the evaluation of distance information by means of the evaluation signal and/or for a production, e.g. a detection, of the evaluation signal in the transmission unit. A reception signal, which carries the distance information and is preferably a high frequency signal, is itself advantageously converted into a low frequency signal, for example after its reception by the distance measuring device. For evaluation of the distance information, the evaluation signal can then be directly compared to the low frequency signal. In this context, a "low frequency signal" is understood to be a signal that has a frequency in a frequency range that permits electronic processing of the signal by existing electronic components. In particular, this should be understood to mean signals that have a frequency between 500 Hz and 100 kHz. In addition, a "high frequency signal" is understood in particular to be a signal that has a frequency between 500 kHz and 1 GHz.

According to another embodiment of the present invention, the transmitter unit includes a transmission means for transmitting the transmission signal and a monitoring unit for monitoring the transmission means; the monitoring unit is embodied in the form of a receiver unit for receiving the evaluation signal. This makes it possible to eliminate an additional reception means, e.g. a photodiode, for receiving the evaluation signal. If the evaluation signal is produced through a mixing in the transmission means and is transmitted by the transmission means at least temporarily with the transmission signal, then the evaluation signal can be detected after a short distance inside the transmitter unit. To this end, the monitoring unit can be embodied in the form of a monitor diode that is provided for monitoring a radiation produced by the transmission means.

A reception signal, which carries the distance information and is preferably a high frequency signal, is itself advantageously converted into a low frequency signal with the evaluation frequency after its reception by the distance measuring device in order to carry out the evaluation of the distance information, for example through a comparison to the evaluation signal. The transmission signal produced by the transmission means can itself contain a low frequency component with the evaluation frequency if the evaluation signal is transmitted by the transmission means, with a mixing occurring in the transmission means itself. Therefore, the transmission signal that has been reflected against a measurement object and received as a reception signal also contains the low frequency component with the evaluation frequency. Consequently, an undesirable overlapping of the low frequency signal with this low frequency component can occur since both of them have the evaluation frequency. A suppression of the low frequency component in the transmission of the transmission signal can be advantageously achieved if the transmitter unit has a transmission means for transmitting the transmission signal and a control unit for controlling the transmission means and provided to counteract a transmission of the transmission signal with the evaluation frequency.

In this connection, it is also preferable for the distance measuring device to include an electrical connection between the control unit and the transmission means, which connection has a detection point for the detection of the evaluation signal. If the low frequency component with the evaluation frequency in the transmission signal is suppressed through an adaptive control of the transmission means, then a corresponding control signal with the evaluation frequency can advantageously be detected as an evaluation signal at the detection point.

With regard to the method, the present invention is based on a method for determining a distance by means of a transmission signal in which the transmission signal is transmitted by a transmission means and the transmission signal is produced by means of two production signals. Preferably, the production signals are mixed and the mixing produces an evaluation signal. As a result, the evaluation signal has a particularly close relationship with the transmission signal in a produced state. If the evaluation signal is embodied in the form of a reference signal, then it is also possible to eliminate a transmission of the reference signal via a reference path, its reception by means of a receiver unit outside the transmitter unit—e.g. by means of a reference diode, and a possible electronic processing of the reference signal. This makes it possible to advantageously eliminate corresponding components and save a corresponding amount of space. A low frequency signal can be simply achieved with a mixing of the production signals, for example if the production signals have two frequencies that differ from each other by the frequency of the desired low frequency signal. The production signals can be embodied in the form of modulation signals for modulating a radiation transmitted by the transmission means. The production signals can be multiplied by one another in the mixing. Alternatively or in addition to this, the production signals can also be added to one another. A multiplication of the production signals can be achieved, for example, if in the production of the transmission signal, a transmission signal characteristic value such as an intensity, a frequency, and/or a phase, is modulated by the production signals in relation to a characteristic curve and the production signals are mixed at a nonlinearity of the characteristic curve. The production signals are advantageously furnished to an input of the transmission means and the mixing can be carried out in the transmission means itself.

Also preferably, the evaluation signal is transmitted at least temporarily by the transmission means and is received by a monitoring unit for monitoring the transmission means. With a production of the transmission signal in the transmission means, a phase shift between the evaluation signal and transmission signal can be advantageously compensated for since the transmission means transmits the evaluation signal and the transmission signal together. By using the monitoring unit for receiving the evaluation signal, it is possible to eliminate an additional reception means.

In an embodiment variant, the evaluation signal is sent to the transmission means as a control signal for controlling the transmission means. It is thus possible to achieve a suppression of a transmission of the evaluation signal by means of the transmission means. In particular, it is advantageously possible for a component, which interferes with an evaluation of a piece of distance information and has a frequency of the evaluation signal, to be suppressed in the transmission signal.

DRAWINGS

Other advantages ensue from the following description of the drawings. The drawings show exemplary embodiments of the present invention. The drawings, the description, and the claims contain numerous features a combination. Those skilled in the art will also suitably consider the features individually and unite them to form other meaningful combinations.

Figure 2:
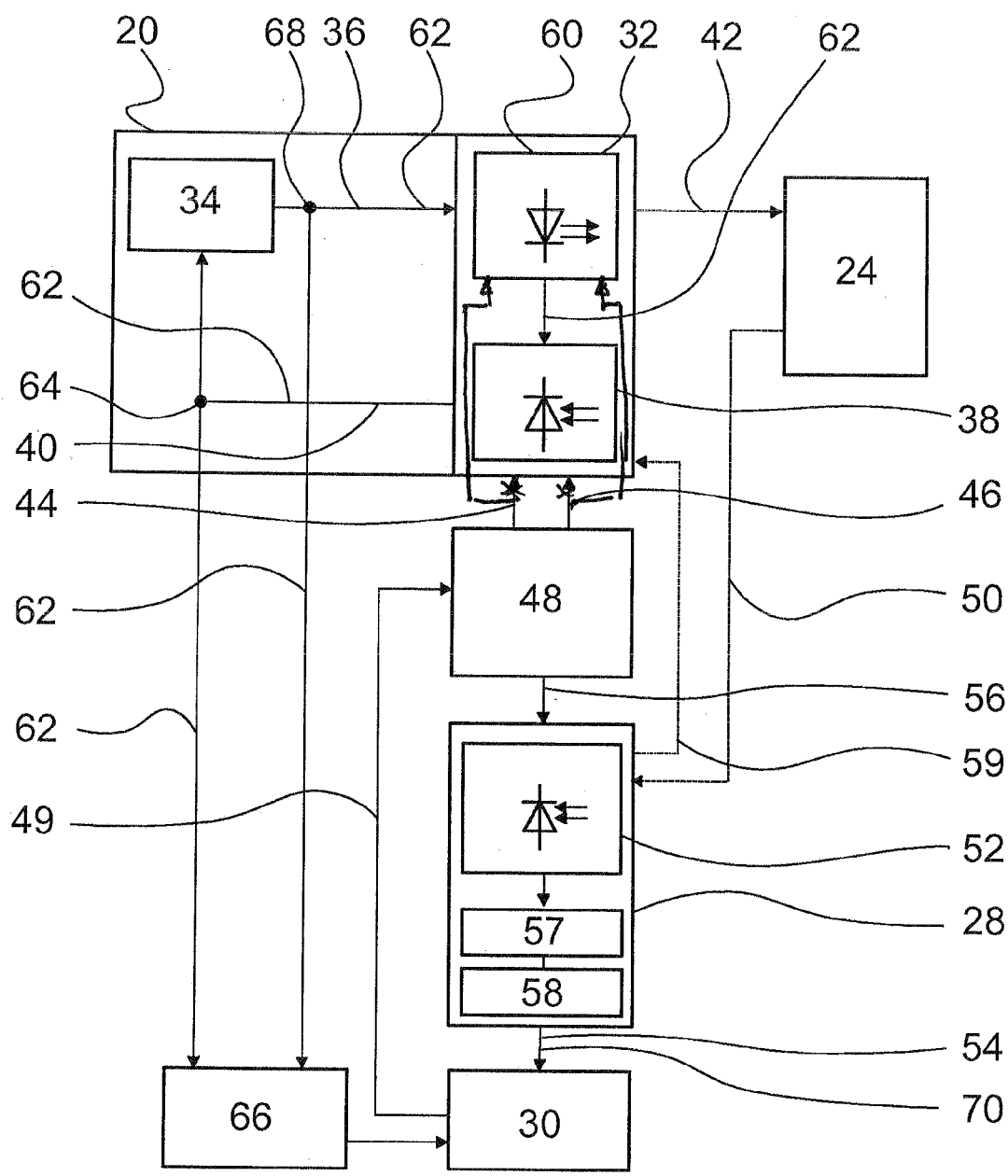
Figure 3:
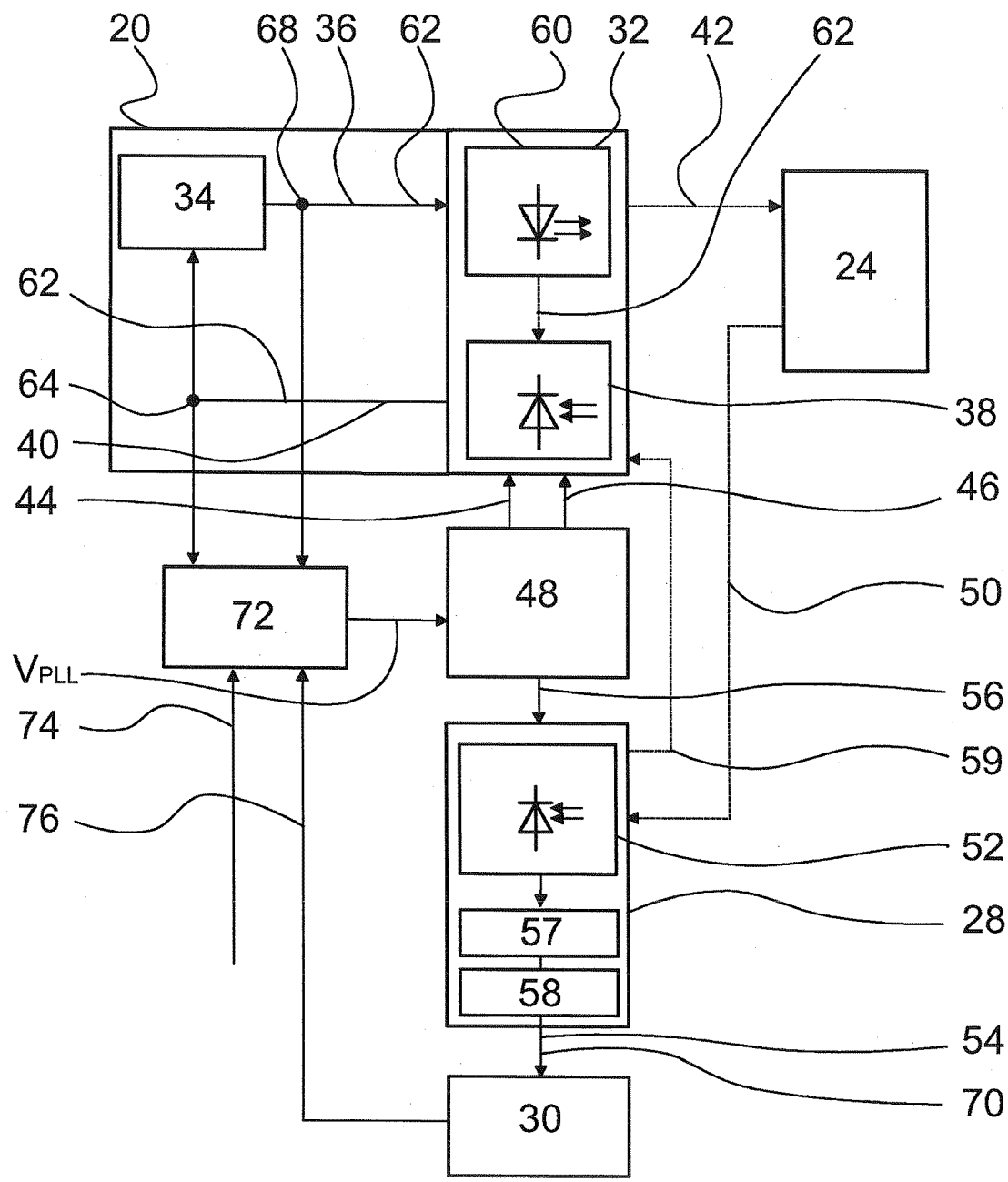

FIG. 1 shows a distance measuring device with a transmitter unit, a receiver unit, and an arithmetic-logic unit, FIG. 2 shows a circuit of the distance measuring device from FIG. 1, with the transmitter unit, the receiver unit, the arithmetic-logic unit, and a means for producing an evaluation signal, and FIG. 3 shows an alternative circuit of the distance measuring device from FIG. 1, equipped with a phase coupling unit.

DESCRIPTION OF THE EXEMPLARY EMBODIMENTS

FIG. 1 shows a distance measuring device embodied in the form of a laser distance measuring device 10. Every signal that does not remain continuously at a d.c. voltage value is referred to below as being associated with a frequency f. The signal in this case can be sinusoidal, rectangular, pulse-shaped, Gaussian, etc. or can be sinusoidal, rectangular, pulse-shaped, Gaussian, etc. for only a limited time. Naturally, it is also conceivable for the signal to have other chronological sequences. In addition to the fundamental oscillation frequency f, other frequencies can occur, namely so-called harmonics. The theory of this is known from mathematics and need not be explained in detail here.

The laser distance measuring device 10 has a housing 12, actuating elements 14 for switching the laser distance measuring device 10 on and off and for starting or configuring a measurement procedure, as well as a display 16. On a support element 18 inside the housing, a transmitter unit 20 is provided for producing a light beam, which during operation of the laser distance measuring device 10, is transmitted via a set of transmission optics 22. The light beam reflected by a surface of a distant measurement object 24 (FIG. 2) is received by a receiver unit 28 via a set of reception optics 26. Based on a phase comparison of the transmitted light beam to the received light beam in an arithmetic-logic unit 30, it is possible to determine a light travel time and, using the speed of light, it is possible to determine the distance sought.

FIG. 2 is a schematic depiction of an internal wiring of the laser distance measuring device 10, showing the transmitter unit 20, the receiver unit 28, and the arithmetic-logic unit 30.

To produce the light beam, the transmitter unit 20 is provided with a transmission means 32 embodied in the form of a laser diode. During operation of the laser distance measuring device 10, it is controlled by a control unit 34 that is connected to the transmission means 32 via an electrical connection 36. By means of the control unit 34, it is possible to adapt particular amplitudes in the frequency spectrum of the light beam for particular uses. For example, the control unit 34 can amplify or suppress certain frequencies in the frequency spectrum. In order to monitor a light beam transmitted by the transmission means 32, the transmitter unit 20 is also provided with a monitoring unit 38 embodied in the form of a monitor diode, which is in turn connected to the control unit 34 via an electrical connection 40. If a light beam transmitted by the transmission means 32 deviates from a form desired for an application, then the control unit 34 can carry out corresponding changes in the light beam.

The light beam transmitted by the transmission means 32 is itself amplitude-modulated by a transmission signal 42. To produce the transmission signal 42, two production signals 44, 46 are supplied to the transmission means 32, which, in the present exemplary embodiment, is embodied in the form of a mixing unit, as explained in greater detail below. The production signals 44, 46 are emitted by an oscillator unit 48 and have measurement frequencies $f_1$ and $f_2$. The oscillator unit 48 has an oscillator for generating the production signals 44, 46 and an additional mixing signal 56 (see below) and has a control circuit for controlling the modulation. These internal components are not shown. The transmission means 32 in this case is at an electrical input voltage V composed of the sum of two voltages $V_1$ and $V_2$, which have the measurement frequencies $f_1$ and $f_2$. As a function of the input voltage V, an intensity I of the emitted light beam in the transmission means 32 has a nonlinear characteristic curve, which, for the sake of clarity, is approximated in the form of a quadratic curve $I(V)=I_0+I_1V+I_2V^2$. If the input voltage V is replaced by the sum of the voltages $V_1$ and $V_2$, then the intensity I is modulated by signals of the measurement frequencies $f_1$, $f_2$ and frequencies that result from a multiplication of the production signals 44, 46. This multiplication of the production signals 44, 46 results from the quadratic term in the characteristic curve. In particular, a frequency $f_A=f_1-f_2$ is produced through the multiplication of the production signals 44, 46 in the transmission means 32 and in the light beam. The measurement frequencies $f_1$ and $f_2$ are both high frequencies. The arithmetic-logic unit 30 controls the oscillator unit 48 via an electrical connection 49.

The light beam reflected by the measurement object 24 is naturally likewise modulated by a high frequency signal of the measurement frequencies $f_1$ and $f_2$, which is referred to as the reception signal 50. Upon reception of the light beam, in comparison to the transmission signal 42 in its produced state, the reception signal 50 has a phase shift that is proportional to the travel time of the light beam from its production to its reception. The reception signal 50 is received by a photo diode 52 of the receiver unit 28. For an electronic analysis of the phase position of the reception signal 50, the high frequency reception signal 50 is used to produce a signal 54 that has a low frequency that is adapted for the electronic analysis of the phase shift. To this end, the reception signal 50 is mixed with a mixing signal 56 of a mixing frequency $f_3$ that is output by the oscillator unit 48. The oscillator unit 48 includes a phase coupling unit not shown in the drawing, which couples the production signals 44, 46 to each other and to the mixing signal 56 in a locked in-phase fashion. The mixing takes place in the receiver unit 28. In the present exemplary embodiment, the mixing occurs in the photo diode 52, which is embodied in the form of an avalanche photo diode. The design and function of such an avalanche photo diode are known so that they need not be discussed in greater detail in the context of the present description. Alternatively, the mixing can occur in the receiver unit 28 outside of the photo diode 52, e.g. in a mixing unit of the receiver unit 28. A low frequency signal, which is produced by the mixing and has the frequency $f_1-f_3$, is supplied to an LF filter 57 (low frequency filter) and an amplifier 58 of the receiver unit 28 and exits the receiver unit 28 in the form of a low frequency signal 54. This is then supplied to the arithmetic-logic unit 30 for analysis of its phase position. Optionally, the mixing signal 56 can be detected inside the receiver unit 28 and supplied to the transmitter unit 20 via an electrical connection 59. The mixing signal 56 can, for example, be coupled directly into the transmission means 32. It is thus possible to achieve a compensation for an unknown phase shift produced when the mixing signal 56 is mixed with the reception signal 50.

The oscillator unit 48 has a phase coupling unit not shown in the drawing, which couples the production signals 44, 46 to each other and to the mixing signal 56 in a locked in-phase fashion.

In order to be able to determine the phase shift proportional to the light travel time based on the phase position of the low frequency signal 54, the arithmetic-logic unit 30 should be supplied with an additional signal that is coupled in a locked in-phase fashion to the transmission signal 42 in its produced state. To this end, in the present exemplary embodiment, as explained in the description below, the transmission means 32 is embodied in the form of a means 60 for producing an evaluation signal 62. For this purpose, the signal of the frequency $f_A=f_1-f_2$, which is produced when the production signals 44, 46 are mixed in the transmission means 32 embodied in the form of the mixing unit, is used as an evaluation signal 62; the frequency $f_A=f_1-f_2$ is referred to as the evaluation frequency $f_A$. The measurement frequencies $f_1$ and $f_2$ are selected so that the evaluation signal 62 has an evaluation frequency $f_A$ that is adapted for an analysis of the phase position of the low frequency signal 54. In the present exemplary embodiment, the measurement frequencies $f_1$ and $f_2$ are selected so that the evaluation signal 62 is a low frequency signal. To this end, the frequencies $f_1$ and $f_2$ differ from each other by a small frequency. In addition, the evaluation signal 62 has a fixed relationship with the transmission signal 42 in its produced state since the former is produced along with the latter in the transmission means 32. The evaluation signal 62 is received by the monitoring unit 38 and converted into an electrical signal. The evaluation signal 62 is detected in an electrical form at a detection point 64 of the electrical connection 40, is processed in an electronic processing unit 66, and is supplied to the arithmetic-logic unit 30 for evaluation of the phase shift sought. Alternatively or in addition to this, the evaluation signal 62 is detected in electrical form at a detection point 68 of the electrical connection 36.

Since the evaluation signal 62 is received by the monitoring unit 38 after being jointly transmitted with the transmission signal 42, this compensates for an undesired phase shift, which occurs between the transmission signal 42 and the evaluation signal 62 during production of the transmission signal 42 in the transmission means 32. This undesired phase shift, which can cause an unknown signal travel time delay, is particularly dependent on conditions in the environment of the transmitter unit 20 such as the working temperature, humidity, etc. This influence of environmental conditions can in particular be linked to an aging state of the transmitter unit 20. Due to the low frequency $f_A$, an additional phase shift during the reception of the evaluation signal 62 in the monitoring unit 38 can be disregarded so that the evaluation signal 62 at the detection point 64 is essentially in phase with the transmission signal 42 in its produced state.

In this connection, when the reception signal 50 is mixed with the mixing signal 56 in the receiver unit 28 embodied in the form of a photo diode, it is likewise possible for an unknown phase shift of the low frequency signal 54 to occur. In order to compensate for this phase shift, two phase analyses are carried out, first of the low frequency signal 54 of the frequency $f_1-f_3$ and then of another low frequency signal 70 of the frequency $f_2-f_3$, which is likewise produced by the mixing of the reception signal 50 with the mixing signal 56. It is thus possible to eliminate the unknown phase shift. These phase analyses can occur simultaneously or in chronological sequence with one another.

In an embodiment variant, the reception signal 50 is mixed with one of the production signals 44, 46, where $f_3=f_2$, for example. In this case, the low frequency signal 54, which is produced from the mixing of the reception signal 50 with the mixing signal 56 of the frequency $f_2$, has the evaluation frequency $f_A=f_1-f_2$. The reception signal 50, like the transmission signal 42, has a low frequency component with the evaluation frequency $f_A$ since the evaluation signal 62 is transmitted in the light beam together with the transmission signal 42. In order to avoid an undesired overlapping of the low frequency component of the evaluation frequency $f_A$ of the reception signal 50 with the low frequency signal 54, in the present exemplary embodiment, the transmission of the low frequency component with the evaluation frequency $f_A$ is suppressed. This is carried out by means of the control unit 34 that regulates the transmission means 32 so that this undesired evaluation frequency $f_A$ in the light beam is counteracted. To this end, the evaluation signal 62 is furnished in negative form to the transmission means 32 as a control signal in order to counteract the undesired evaluation frequency $f_A$. It is thus possible for the evaluation signal 62 to continue being detected in an electrical form at the detection point 68.

FIG. 3 shows an alternative embodiment of the circuit of the laser distance measuring device 10. It has a phase coupling unit 72 that is composed of a PLL circuit. This includes a phase comparator, not shown, which compares the phase position of the evaluation signal 62 to the phase position of a reference signal 74 supplied to the PLL circuit and is controlled by the arithmetic-logic unit 30 via an electrical connection 76. The PLL circuit produces an electrical voltage $V_{PLL}$, which depends on a phase difference between the reference signal 74 and the evaluation signal 62. This voltage $V_{PLL}$ controls a VCO circuit, not shown in the drawing, which produces the production signals 44, 46 and the mixing signal 56. Through a regulation of the production signals 44, 46 with the aid of the PLL circuit and VCO circuit, the evaluation signal 62 and the transmission signal 42 are coupled to the reference signal 74 in a locked in-phase fashion and with a known phase position in relation to each other. With the reference signal 74, which is produced by an oscillator, not shown, and whose phase position is known, it is possible, through a phase analysis of the low frequency signal 54, to determine the phase shift of the reception signal 50 and then, the desired distance to the measurement object 24. The reference signal 74 can alternatively be generated by the arithmetic-logic unit 30.

REFERENCE NUMERALS

| | |
|---|---|
| 10 | laser distance measuring device |
| 12 | housing |
| 14 | actuating element |
| 16 | display |
| 18 | support element |
| 20 | transmitter unit |
| 22 | transmission optics |
| 24 | measurement object |
| 26 | reception optics |
| 28 | receiver unit |
| 30 | arithmetic-logic unit |
| 32 | transmission means |
| 34 | control unit |
| 36 | electrical connection |
| 38 | monitoring unit |
| 40 | electrical connection |
| 42 | transmission signal |
| 44 | production signal |
| 46 | production signal |
| 48 | oscillator unit |
| 49 | connection |
| 50 | reception signal |
| 52 | photo diode |
| 54 | signal |
| 56 | mixing signal |
| 57 | LF filter |
| 58 | amplifier |
| 59 | electrical connection |
| 60 | means |
| 62 | evaluation signal |
| 64 | detection point |
| 66 | processing unit |
| 68 | detection point |
| 70 | signal |
| 72 | phase coupling unit |
| 74 | reference signal |
| 76 | connection |
| $f_1$ | measurement frequency |
| $f_2$ | measurement frequency |

-continued

| | |
|---|---|
| $f_A$ | evaluation frequency |
| $f_3$ | mixing frequency |
| V | input voltage |
| $V_1$ | voltage |
| $V_2$ | voltage |
| $V_{PLL}$ | voltage |
| I | intensity |

What is claimed is:

1. A distance measuring device equipped with a transmitter unit (20) for producing a transmission signal (42) that has at least one measurement frequency ($f_1$, $f_2$) desired for a detection of a piece of distance information, wherein the transmitter unit (20) includes a means (60) for producing an evaluation signal (62), which has an evaluation frequency ($f_A$) desired for an evaluation of the distance information, wherein the means (60) for producing the evaluation signal is embodied in the form of a mixing unit for mixing production signals (44, 46) used to produce the transmission signal (42), and a phase coupling unit (72) is provided to couple the evaluation signal (62) to a reference signal (74) in a locked in-phase fashion through a regulation of the production signals (44, 46).

2. The distance measuring device as recited in claim 1, wherein the transmitter unit (20) has a transmission means (32) for transmitting the transmission signal (42) and the transmission means (32) is embodied in the form of a mixing unit.

3. The distance measuring device as recited in claim 1, wherein the evaluation signal (62) is a low frequency signal.

4. The distance measuring device as recited in claim 1, wherein the transmitter unit (20) includes a transmission means (32) for transmitting the transmission signal (42) and includes a monitoring unit (38) for monitoring the transmission means (32), with the monitoring unit (38) being embodied in the form of a receiver unit for receiving the evaluation signal (62).

5. The distance measuring device as recited in claim 1, wherein the transmitter unit (20) has a transmission means (32) for transmitting the transmission signal (42) and has a control unit (34), which is for controlling the transmission means (32) and is provided to counteract a transmission of the transmission signal (42) with the evaluation frequency ($f_A$).

6. The distance measuring device as recited in claim 5, characterized by means of an electrical connection (36) between the control unit (34) and the transmission means (32), which connection has a detection point (68) for the detection of the evaluation signal (62).

7. A method for determining a distance by means of a transmission signal (42) in which the transmission signal (42) is transmitted by a transmission means (32) and the transmission signal (42) is produced by means of two production signals (44, 46),
wherein the production signals (44, 46) are mixed and the mixing produces an evaluation signal (62), and wherein the evaluation unit (62) is coupled by a phase coupling unit (72) to a reference signal in a locked in-phase fashion through a regulation of the production signals (44, 46).

8. The method as recited in claim 7, wherein the evaluation signal (62) is transmitted at least temporarily by the transmission means (32) and is received by a monitoring unit (38) for monitoring the transmission means (32).

9. The method as recited in claim 7, wherein the evaluation signal (62) is transmitted to the transmission means (32) as a control signal for controlling the transmission means (32).

* * * * *